United States Patent [19]

Lehmann et al.

[11] 4,038,454
[45] July 26, 1977

[54] PRESSURE SENSITIVE ADHESIVE COATED SHEET MATERIAL

[75] Inventors: G. W. Horst Lehmann; H. A. Julius Curts, both of Hamburg, Germany

[73] Assignee: Beiersdorf Aktiengesellschaft, Hamburg, Germany

[21] Appl. No.: 505,999

[22] Filed: Sept. 16, 1974

Related U.S. Application Data

[60] Continuation of Ser. No. 315,990, Dec. 18, 1972, abandoned, which is a continuation of Ser. No. 85,762, Oct. 30, 1970, abandoned, which is a division of Ser. No. 8,033, Feb. 2, 1970, Pat. No. 3,563,953, which is a continuation-in-part of Ser. No. 549,468, May 12, 1966, abandoned.

[30] Foreign Application Priority Data

May 19, 1966 Germany .................................. 82010

[51] Int. Cl.$^2$ .......................... C09J 7/04; C08L 33/08
[52] U.S. Cl. ................................. 428/356; 260/830 R; 260/831; 526/16; 526/48; 428/355
[58] Field of Search ............... 260/80.72, 86.1 E, 831, 260/836; 428/355, 356; 526/16, 48, 831, 830

[56] References Cited

U.S. PATENT DOCUMENTS

| | | | |
|---|---|---|---|
| 2,606,810 | 8/1952 | Erickson et al. | 260/86.1 R |
| 3,008,848 | 11/1961 | Annonio | 260/831 |
| 3,025,181 | 3/1962 | Nussle et al. | 260/80.72 |
| 3,156,674 | 11/1964 | Shokal et al. | 526/48 |
| 3,222,419 | 12/1965 | Jubliee | 260/836 |
| 3,284,423 | 11/1966 | Knapp | 260/86.1 R |
| 3,579,490 | 5/1971 | Korozinski et al. | 260/80.72 |

*Primary Examiner*—George F. Lesmes
*Assistant Examiner*—R. J. Roche
*Attorney, Agent, or Firm*—Stevens, Davis, Miller & Mosher

[57] ABSTRACT

A novel cured pressure-sensitive adhesive-coated sheet material comprising a flexible backing having bonded thereto a pressure-sensitive adhesive material containing copolymers of 2-ethyl hexyl acrylate, butyl acrylate and glycidyl acrylate or glycidyl methacrylate. The monomer-mixture for the pressure-sensitive adhesive material may also contain minor amounts of monomers with acid anhydride groups or monomers with carboxyl groups. The curing of the pressure-sensitive adhesive material is accomplished by heating the copolymers to a temperature between 60° and 100° C., in the presence of a zinc chloride catalyst whereby the copolymers become cross-linked to obtain a solvent-, heat- and weather-resistant pressure-sensitive adhesive-coated sheet material.

6 Claims, No Drawings

PRESSURE SENSITIVE ADHESIVE COATED SHEET MATERIAL

CROSS REFERENCE TO RELATED APPLICATION

This application is a continuation application of U.S. Ser. No. 315,990 filed Dec. 18, 1972, now abandoned which is a continuation application of U.S. Ser. No. 85,762 filed Oct. 30, 1970, now abandoned, which is a divisional application of U.S. Ser. No. 8,033 filed Feb. 2, 1970, now U.S.P. No. 3,563,953 and which in turn is a continuation-in-part application of U.S. Ser. No. 549,468 filed May 12, 1966, now abandoned.

The invention relates to a process for the production of self-adhesive tapes or films resistant to solvent, heat and weather wherein a pressure-sensitive adhesive composition comprising an acrylate copolymer, with the addition of a small proportion of a catalyst, is applied to a flexible support, and is then subjected on the support to curing (cross-linking) by the action of heat for a short period at a relatively low temperature.

Hitherto known polyacrylate adhesive compositions are more resistant to the action of oxygen and light then adhesive compositions on a rubber base, but they exhibit thermoplasticity, cold flow and, owing to their ready solubility in organic solvents, a high degree of a sensitivity to solvents. Adhesive compositions with an improved capacity to adhere quickly on contact have been described, which are obtained by the copolymerisation of acrylates with a small proportion of an ethylenically unsaturated monomer copolymerisable therewith and containing a strongly polar group, such as acrylic acid, methacrylic acid, acrylic acid amide, methacrylic acid amide, acrylonitrile and/or methacrylonitrile. Such adhesive compositions, which have been proposed more particularly for packing purposes, but cannot be used for many fields of application owing to their limited resistance to organic solvents, can be applied to flexible film or fibrous supports and then reacted on the supports, under the action of heat, with polyfunctional compounds (for example aliphatic polydiols, aliphatic polyamines, epoxide resins and aminoalcohols) or with benzoyl peroxide. Pressure-sensitive adhesive tapes prepared in this manner show some improvement in their resistance to solvents and resistance to heat, but at the same time a substantial decrease in their capacity for rapid adhesion on contact. Furthermore, comparatively higher temperatures and longer heating times are necessary for the reaction of cross-linking on the support.

It is an object of the present invention to provide self-adhesive tapes or self-adhesive film which, in addition to good resistance The invention relates to a process for the production of self-adhesive tapes or films resistant to solvents, heat and weather wherein a pressure-sensitive adhesive composition comprising an acrylate copolymer, with the addition of a small proportion of a catalyst, is applied to a flexible support, and is then subjected on the support to curing (cross-linking) by the action of heat for a short period at a relatively low temperature.

Hitherto known polyacrylate adhesive compositions are more resistant to the action of oxygen and light than adhesive compositions on a rubber base, but they exhibit thermoplasticity, cold flow and, owing to their ready solubility in organic solvents, a high degree of a sensitivity to solvents. Adhesive compositions with an improved capacity to adhere quickly on contact have been described, which are obtained by the copolymerisation of acrylates with a small proportion of an ethylenically unsaturated monomer copolymerisable therewith and containing a strongly polar group, such as acrylic acid, methacrylic acid, acrylic acid amide, methacrylic acid amide, acrylonitrile and/or methacrylonitrile. Such adhesive compositions, which have been proposed more particularly for packing purposes, but cannot be used for many fields of application owing to their limited resistance to organic solvents, can be applied to flexible film or fibrous supports and then reacted on the supports, under the action of heat, with polyfunctional compounds (for example aliphatic polydiols, aliphatic polyamines, epoxide resins and aminoalcohols) or with benzoyl peroxide. Pressure-sensitive adhesive tapes prepared in this manner show some improvement in their resistance to solvents and resistance to heat, but at the same time a substantial decrease in their capacity for rapid adhesion on contact. Furthermore, comparatively higher temperatures and longer heating times are necessary for the reaction of cross-linking on the support.

It is an object of the present invention to provide self-adhesive tapes or self-adhesive film which, in addition to good resistance to solvents, heat and weather, exhibit at the same time a good capacity for rapid adhesion on contact, a property herein referred to for brevity as the "quick-stick" property. It is a further object of the invention to provide copolymers which, after the addition of a small proportion of a catalyst, can be cured or cross-linked on the support at low temperatures, preferably in the temperature range 60° to 100° C. in a very short time of action, for example in a period of between 2 and 7 minutes.

According to the present invention there is provided a process for the production of self-adhesive tapes or films having a substantial resistance to the action of solvents, heat and weather, which comprises applying to a flexible support a pressure-sensitive adhesive composition which comprises a copolymer of (a) 100 parts by weight of a primary alkyl acrylate of which the alkyl group contains at least 4 carbon atoms, or a mixture of primary alkyl acrylates of which the alkyl groups contain 1 to 14 carbon atoms but of which at least half by weight is provided by alkyl acrylates of which the alkyl groups contain at least 4 carbon atoma, with (b) between 0.25 and 11 parts by weight of one or more ethylenically unsaturated monomers which contain reactive epoxide groups and which are copolymerisable therewith, and further comprises from 0.05 to 5% of catalyst based on the weight of the copolymer, and curing the said composition on the support by the application of heat.

Examples of compounds of class (b) are glycidyl methacrylate, glycidyl acrylate and allylglycidyl ether.

According to further features of the invention the acid copolymer is formed from (a) and (b), as aforesaid together with (c) between 0.25 and 15 parts by weight of one or more ethylenically unsaturated monomers which contain acid anhydride groups, for example maleic anhydride, or with (d) between 0.25 and 3 parts by weight of ethylenically unsaturated compounds which contain carboxyl groups in the molecule, for example acrylic acid, methacrylic acid, crotonic acid or itaconic acid, or with (e) between 0.25 and 15 parts by weight of diketene (i.e., β hydroxyvinyl acetic acid lactone), the total quantity of components (b) and, as selected, (c), or (e) not exceeding 15 parts by weight of the final polymer.

The alkyl group of the primary alkyl acrylate used for copolymerization should, if only one ester is used, contain at least 4 carbon atoms (for example n-butyl acrylate). If lower alkyl acrylates, which contain less than 4 carbon atoms in the alkyl groups, are also used for the preparation of the copolymer, alkyl acrylates which contain more than 4 carbon atoms in the alkyl group, for example 2-ethylhexyl acrylate, must be present in the monomeric mixture at the same time, in order to obtain copolymers with self-adhesive properties. At least half of the alkyl acrylate should contain 4 carbon atoms or more in the alkyl group. The higher the alkyl acrylates (up to about 10 carbon atoms in the alkyl group) used as comonomers for polymerization, the stickier is the resulting adhesive composition, i.e., the higher the quick-stick of the copolymers formed will be.

The content of compounds that contain reactive epoxide groups besides polymerizable double bonds, for example glycidyl methacrylate, glycidyl acrylate, allylglycidyl ether (component (b)), depends on the degree of cross-linking it is desired to obtain. It may be between 0.25 and 11 parts by weight related to 100 parts by weight of the acrylate component (a). Below 0.25 part by weight no appreciable improvement compared with a homopolymer consisting solely of alkyl acrylates will be obtained, while above about 11 parts by weight the copolymer obtainable will be too hard and lacquer-like. If the copolymerization of the compounds containing epoxide groups is effected predominantly with butyl acrylate or isooctyl acrylate, the most advantageous content is between 1 and 3 parts by weight in relation to 100 parts by weight of the acrylate component. When, besides compounds that contain reactive epoxide groups in addition to polymerizable double bonds (component (b)), compounds are to be polymerised in, as further additional components, that, besides polymerisable double bonds, contain acid anhydride groups, for example maleic anhydride (component (c)) or those that, besides polymerisable double bonds, contain carboxyl groups, for example acrylic acid, methacrylic acid, crotonic acid or itaconic acid (component (d)) or diketene ($\beta$-hydroxyvinyl acetic acid lactone) (component (e)), the monomeric mixture should contain between 0.5 and 15 parts by weight of the sum of the two comonomers (b) + (c) or (b) + (d) or (b) + (e) in relation to 100 parts by weight of the acrylate component (a). The proportion of component (c), (d) or (c) can then be chosen between the stated limits. The total proportion of monomers (b) and (c), or (b) and (d) or (b) and (e), however, should not exceed about 15 parts by weight related to 100 parts by weight of the acrylate component (a), otherwise lacquer-like products will be obtained. Especially favourable results are obtained if the monomeric mixture has a content of, in each case, between 1 and 4 parts of components (b) and (c) related to 100 parts by weight of the acrylate component (a), for example one of 2.5 parts by weight of glycidyl methacrylate in addition to 1.5 parts by weight of maleic anhydride related to 100 parts by weight of a mixture of 2-ethylhexyl acrylate and butyl acrylate. On the polymerisation of such a monomeric mixture, a copolymer is obtained which, in addition to epoxide groups, contains acid anhydride groups, which can be cross-linked with one another by means of catalysts.

Instead of copolymers of acrylates with monomers containing epoxide groups and compounds containing acid anhydride groups, mixtures of two separately prepared copolymers may also be used for the process according to the invention, for example a mixture of a copolymer of acrylates and compounds containing epoxide groups with a copolymer of acrylates and monomers containing acid anhydride groups.

Apart from the above-mentioned monomers, there may be added to the monomeric mixture, to modify the properties of the cpolymer, small proportions of other monomers, such as itaconic acid ester (for example itaconic acid dibutyl ester), acrylic or nothacrylic acid amides, vinyl ethers and vinyl esters, in which case it must be borne in mind when making the selection that the fundamental properties of the copolymer should not be disadvantageously altered.

The copolymers are prepared in the usual manner with the use of catalysts that only cause the double bond to react, for example radical-forming agents, such as dibenzoyl peroxide or $\alpha,\alpha'$-azoisobutyric acid dinitrile, and the polymerisation may be effected in solution or in the form of emulsion polymerisation (with redox catalysts). Linear or at the most branched acrylate copolymers are then obtained which contain reactive epoxide groups and, if desired, other reactive groups also, such as acid anhydride groups, acid groups or $\beta$-lactone rings.

In order to react the epoxide groups as quickly as possible and at the lowest possible temperatures and thereby to cross-link the copolymer, between about 0.05 and 5% by weight (related to solid copolymer) of a catalysts are added to the copolymer, which is preferably in the form of a solution in an organic solvent. The copolymer is applied to a flexible support, the coated support is passed through a heated drying conduit to evaporate the solvent, and then heated for a short time to a temperature between 50° and 150° C, preferably for a period of between 2 and 7 minutes to a temperature between 60 and 100° C, in order to cure it, in a solvent-free or nearly solvent-free state.

Catalysts that may be used in the process according to the invention include substances having the nature of salts, for example zinc chloride, magnesium chloride, monosalts of maleic acid or maleic anhydride combined with a tertiary amine, or substances having an acid character, for example butyl phosphoric acid, octyl phosphoric acid, p-toluenesulphonic acid, oxalic acid or maleic acid. If acid anhydride groups are also present in the copolymer in addition to epoxide groups, the cross-linking reaction between the epoxide groups and the acid anhydride groups is accelerated by tertiary amines, for example triethyl amine, triethanol amine and/or Friedel-Crafts catalysts, for example zinc chloride. It is necessary to add a catalyst, as cross-linking or curing would otherwise take place only at substantially higher temperatures and in substantially longer periods.

To modify the properties of the adhesive compositions, polyfunctional compounds or resins, which also have a cross-linking action or enhance tackiness may also be added to the copolymer, for example reactive, thermosetting phenol-formaldehyde resins and/or epoxide resins and/or resin adhesives, for example polyterpene resin or terpenephenolic resin. Ester resins and thermoplastic or non-reactive phenolic resins are also suitable as tackifying resins for the purpose in question. Fillers, dyes or pigments may also be added to the adhesive composition in small proportions to obtain special effects.

The self-adhesive tapes or films obtainable according to the invention possess a very good quick-stick and at the same time an excellent resistance to ageing and ultraviolet light, and very good thermal stability under load or holding power at elevated temperatures and resistance to the action of solvents. The good quick-stick is shown with a wide variety of surfaces, for example glass, metal, various plastics, wood, paper and the human skin (even if not specially pretreated or degreased). In contrast to known self-adhesive compositions having a base of cross-linked acrylate copolymers, the self-adhesive tapes prepared according to the invention do not show any deterioration of the quick-stick property even after prolonged storage under unfavourable conditions, for example after being stored for 6 weeks at a temperature of 70° C.

The self-adhesive tapes produced according to the invention possess holding power at elevated temperatures up to about 150° C and are resistant to water, salt water, petrol and oil, if a support material has been chosen that is likewise resistant to these liquids. They stick even at extreme temperatures between about −40° and +150° C.

Flexible supports that may be used in the process according to the invention include paper, fabric of all kinds, fibre fleeces, sheeting made of plastics or modified natural substances, metal foil, metallised plastics sheeting, asbestos fibre fabric and glass fibre fabric, so that there is a wide choice of suitable support material. As the acrylate copolymers according to the invention have the advantage, compared with known copolymers, that they only need brief heat treatment at relatively low temperatures after the addition of a catalyst and application to the support for curing or cross-linking, even sensitive support materials, for example plasticised polyvinyl chloride, can be used in the process according to the invention.

The self-adhesive stapes or self-adhesive films obtained according to the invention can be used for a wide variety of purposes in view of their valuable properties combined with a simple method of production, for example for packing purposes, as films for documents and self-adhesive films suitable for writing, for decorative sheeting, self-adhesive labels or the like, and for the production of plaster for dressings. As the copolymers have very good insulating properties and do not attack the stuck surfaces, for example metals, they can be used to make excellent sheets for electrical insulation.

The following examples will serve to illustrate the invention.

EXAMPLE 1

490 parts by weight of 2-ethylhexyl acrylate, 490 parts by weight of n-butyl acrylate and 20 parts by weight of glycidyl methacrylate were mixed, with the addition of 2 parts by weight of dibenzoyl peroxide, with 306 parts by weight of acetone and 123 parts by weight of petrol, and the mixture was heated to 65° C while stirring in a nitrogen atmosphere in a vessel surrounded by a heating and cooling bath provided with a reflux condenser. After a short time polymerisation set in. It was continued for a period of 20 hours while the mixture was gradually diluted with petrol.

The solid content of the copolymer solution obtained was 22–24%. The K value according to Fikentscher ("Cellulose-Chemie" 13 [1932], p. 58), measured from a 1% solution of the copolymer in toluene, was 97–100. To determine the K value, the solution of the copolymer obtained in the manner described was spread out in a thin film on a glass plate, dried at room temperature and then dissolved in toluene in the proportion required to produce a 1% solution.

1 part by weight of zinc chloride to each 100 parts by weight of solid content was added in the form of a suspension in acetone to the solution of the copolymer and spread on to a polyethylene terephthalate film 0.025 mm thick, which had previously been provided with a thin priming coat of an acrylate copolymer as an anchorage coat for the adhesive composition, in a coating thickness of 25 g/m$^2$ with the use of a conventional coating device. To evaporate the solvent, the coated film was passed through a heated drying conduit and, after the removal of the solvent, it was then heated for 3 minutes to a temperature of 100° C to cure and cross-link the copolymer. The coating, drying and curing processess are advantageously carried out with the use of a machine with a drying conduit of appropriate length. The finished adhesive films or adhesive tapes can then be cut into strips of the desired width and wound on rollers. For this purpose, the backs of the sheets, films or tapes may be provided with adhesive-repellent coats beforehand, or the adhesive side of the support can be covered with paper, which is provided with an adhesive-repellent coat, for example a silicone separating layer.

The resulting pressure-sensitive adhesive tapes showed a good bond strength on steel of about 300 g/cm (strip-off angle:180°, strip-off speed 200 mm/min) and very good thermal stability.

To test the holding power at an elevated temperature, a steel plate measuring 4.8 × 10 cm 1.6 mm thick was polished with abrasive paper in a longitudinal direction and cleaned with hot petrol. An adhesive tape about 15 cm long and 2 cm wide was stuck to the steel plate so that, from the edge of one narrow side, a length of 2.54 cm (= 1 inch) lay on the steel plate and the stuck-on part of the adhesive tape was pressed on by rolling a roller weighing 2 kg slowly to and fro once. The free end of the tape was loaded by vertical suspension with an 800 g weight. The test was carried out at various temperature and the time until the tape together with the weight fell off was measured. The holding power at elevated temperatures determined in this manner was over 20 hours at all temperatures up to 150° C. Comparison tests on non-vulcanished rubber self-adherent compositions and non-cross-linked polyacrylate self-adherent compositions, on the other hand, yielded values, with the same load, of about 3 to 10 minutes at 100° C and 10 to 40 minutes at 50° C.

By "quick-stick" is meant the immediate adhesiveness of a pressure-sensitive adhesive tape at the moment of contact between the self-adherent composition and the surface to which is to be stuck. To determine the quick-stick, an adhesive tape 150 cm long and about 2 cm wide, with the adhesive side upwards, was stuck to a bar bent concavely downwards with a given radius of curvature. A steel balll weighing 63.6 g was then caused to roll downwards over the sticking surface of the tape, the difference in height between the starting point of the ball and the end point of the 150 cm-long adhesive tape being 250 mm. The distance from the starting point to the halting point of the ball, measured in centimetres, gave the quick-stick. The smaller the value, i.e. the more the ball is slowed down by the greater adhesiveness of the stuck-on tape, the better the quick-stick is.

The adhesive tapes produced according to the above example showed quick-stock values between 40 and 80 cm. In comparison, the corresponding value for known self-adherent tapes on an acrylate base was over 150 cm.

To test the resistance to water and solvents, adhesive tapes were stuck to aluminium plates and glass plates and kept in the liquid for periods of up to one week. The adhesion of the adhesive tapes, particularly at the edges, was then judged. This was perfect in water, salt water, alcohol, petrol and machine oil.

Even after storage for 4 weeks at 20°, 40° and 70° C with and without irradiation with ultra-violet light, no undesirable changes occurred.

Tapes stuck on to white paper showed at temperatures of up to 70° C, with a load of 2 kg/cm$^2$, over a period of 4 weeks, neither greasing phenomena nor swelling-out of the adhesive composition at the edges.

On the surfaces of varius materials, such as paper, polyvinyl chloride, glass, metal, wood, lacquer, etc., slight pressure with the finger was enough to make the adhesive tape adhere very well. Even on the human skin, the adhesive tapes and the like produced according to the invention adhere excellently.

Corresponding result were also obtained when a cellulose acetate film 0.040 mm thick was used as a support instead of the polyethylene terephthalate film described.

EXAMPLE 2

100 parts by weight of methyl acrylate,
290 parts by weight of n-butyl acrylate,
590 parts by weight of 2-ethylhexyl-acrylate,
20 parts by weight of glycidyl methacrylate,
2 parts by weight of dibenzoyl peroxide,
300 parts by weight of acetone, and
130 parts by weight of benzene were copolymerised as described in Example 1, the resulting solution of the copolymer was then mixed with 0.5% toluenesulphonic acid (calculated on the solid content) and spread on a cellulose acetate film 0.040 mm thick. When the resulting adhesive tape was tested, approximately the same results were obtained as with the self-adherent tape produced in accordance with Example 1.

EXAMPLE 3

83 parts by weight of 2-ethylhexyl acrylate,
64 parts by weight of n-butyl acrylate,
2.5 parts by weight of maleic anhydride,
3.6 parts by weight of glycidyl methacrylate,
0.46 part by weight of dibenzoyl peroxide, and
153 parts by weight of acetone were copolymerised as described in Example 1.

The solid content of the resulting solution of the copolymer was 42%, and the K value (according to Fikentscher), measured from a 1% solution of the copolymer in toluene, was 82.

1 part by weight of triethanol amine (related to 100 parts by weight of dry substance of the copolymer) was added to the resulting solution of the copolymer, and the mixture was applied to a metallised polyethylene terephthalate film in a coating thickness of 30 g/m$^2$. After the evaporation of the solvent the coated film was heated for 5 minutes to 80° C for curing and cross-linking. The resulting self-adherent tape had a bond strength on steel of about 250 g/cm.

Similarly good results were also obtained when zinc chloride, pyridine and dimethyl aniline were used as catalysts instead of the triethanol amine described.

EXAMPLE 4

144 parts by weight of 2-ethylhexyl acrylate,
144 parts by weight of n-butyl acrylate,
6 parts by weight of glycidyl methacrylate,
6 parts of acrylic acid,
0.6 parts by weight of dibenzoyl peroxide,
150 parts by weight of acetone, and
50 parts by weight of petrol were heated in two-litre three-necked flask with the introduction of nitrogen, reflux condensation and stirring in a water bath. The mixture began to polymerise at 63° C. After about one hour about 700 parts by weight of petrol were added in batches over a period of 8 hours. The K value of the resulting copolymer was 95 (determined from a 1% solution in toluene). 0.5% of zinc chloride (calculated on solid material) was added to the cooled solution of the copolymer and the mixture was spread on a polyethylene terephthalate film with a coating thickness of 0.2 mm, this film having previously been provided with a thin coat of a vinylidene chloride-acrylonitrile copolymer as an anchorage coat for the adhesive composition. After brief air-drying, a sample in each case was heated to 80° and 100° C for 5 minutes with air circulation in a drying cabinet to cure and cross-link the copolymer. The adhesive coat was then covered with paper tapes which had been provided with an adhesive-repellent silicone coat (release paper). The measurements taken after 24 hours for the self-adherent tapes produced in this manner yielded the following values:

Thickness of adhesive coat: about 23 g/m$^2$.
Bond strength on steel: 330 g/cm.
Holding power at elevated temperatures at 100° C with a load of 800 g: > 90 min.
Quick-stick: about 80 cm.
Resistance to petrol and water: as described in Example 1.

EXAMPLE 5

147 parts by weight of 2-ethylhexyl acrylate,
147 parts by weight of n-butyl acrylate,
3 parts by weight of glcyidyl methacrylate,
9 parts by weight of diketone,
0.61 part by weight of dibenzoyl peroxide,
93 parts by weight of acetone, and
37 parts by weight of petrol were copolymerised in a two-litre three-necked flask with stirring and the introduction of nitrogen at 60°–70° C. After a reaction time of about one hour 780 parts by weight of petrol were added in batches over a period of 11 hours.

The resulting copolymer had a K value of about 100 (determined from a 1% solution in toluene).

0.5% of zinc chloride (calculated on solid material) was added to the resulting solution of the copolymer and a coat of this mixture having a thickness of 0.2 mm was spread on a polycarbonate film. After brief air-drying to evaporate the solvent, the coated film was then heated to a temperature of 60° C for 5 minutes with air circulation in a drying cabinet to cure and cross-link the copolymer. The adhesive coat was then covered with release paper.

The test, carried out after 24 hours, of the properties of a self-adherent strip produced in this manner yielded the following values:

Thickness of adhesive coat: about 30 g/m$^2$.
Holding power at elevated temperatures:

At 100° C with a load of 800 g: > 90 min.
At 50° C with a load of 800 g: > 90 min.
Bond strength on steel: 230 g/cm
Quick-stick 75 cm.
Resistance to petrol and water: as stated in Example 1.

What is claimed is:

1. A pressure-sensitive adhesive-coated sheet material cured in the presence of from 0.05 to 5% of zinc chloride at 60°–100° C., which is resistant to the action of solvents, heat and weather and which at the same time possesses good "quick-stick" properties, comprising a flexible backing having bonded thereto a pressure-sensitive adhesive material in the form of a cured coating of a copolymer having a K-value of from 82 to about 100 (determined from a 1% solution of the copolymer in toluene) said copolymer obtained by solution polymerization being a copolymer of monomers consisting essentially of:
   a. 100 parts by weight of a mixture composed of approximately equal parts of 2-ethylhexyl acrylate and n-butyl acrylate, and
   b. between 0.25 and 4 parts by weight of at least one ethylenically unsaturated monomer selected from the group consisting of glycidyl acrylate and glycidyl methacrylate, said percentage of zinc chloride being based on the weight of the copolymer.

2. A pressure-sensitive adhesive-coated sheet material according to claim 1 in which the adhesive material in the form of a cured coating consists essentially of a copolymer of monomers (a) and (b) and
   c. between 0.25 and 4 parts by weight of maleic anhydride.

3. A pressure-sensitive adhesive-coated sheet material according to claim 1 in which the adhesive material in the form of a cured coating consists essentially of a copolymer of monomers (a) and (b) and
   d. between 0.25 and 3 parts by weight of at least one ethylenically unsaturated monomer selected from the group consisting of acrylic acid and itaconic acid.

4. A pressure-sensitive adhesive-coated sheet material according to claim 1 in which the adhesive material further contains a resin selected from the group consisting of reactive, thermosetting phenol-formaldehyde resins and epoxide resins which have a cross-linking action on the adhesive material under curing conditions.

5. A pressure-sensitive adhesive-coated sheet material cured in the presence of 0.05 to 5% zinc chloride at 60° to 100° C., which is resistant to the action of solvents, heat and weather and which at the same time possesses good "quick-stick" properties, comprising a flexible backing having bonded thereto a pressure-sensitive adhesive material in the form of a cured coating of a copolymer having a K-value of from 82 to about 100 (determined from a 1% solution of the copolymer in toluene) said copolymer obtained by solution polymerization being a copolymer of monomers consisting essentially of:
   a. 100 parts by weight of a mixture composed of approximately equal parts of 2-ethylhexyl acrylate and n-butyl acrylate, and
   b. between 1 and 4 parts by weight of at least one ethylenically unsaturated monomer selected from the group consisting of glycidyl acrylate and glycidyl methacrylate, and
   c. between 1 and 4 parts by weight of maleic anhydride, said percentage of zinc chloride being based on the weight of the copolymer.

6. A pressure-sensitive adhesive-coated sheet material according to claim 5 in which the adhesive material in the form of a cured coating consists essentially of a copolymer of
   a. 100 parts by weight of a mixture composed of approximately equal parts of 2-ethylhexyl acrylate and butyl acrylate,
   b. 2.5 parts by weight of glycidyl methacrylate, and
   c. 1.5 parts by weight of maleic anhydride.

* * * * *